Figures 1, 4:
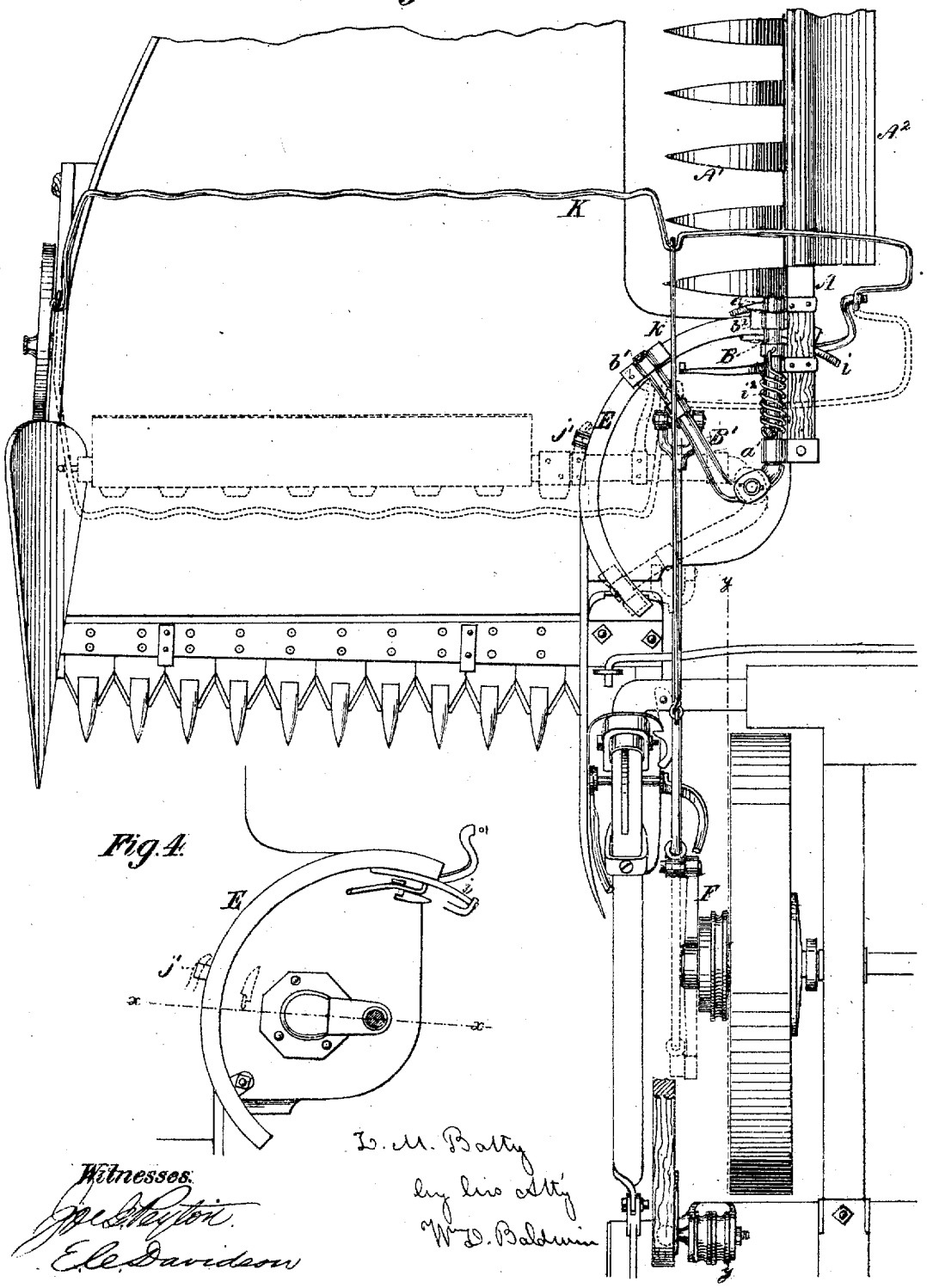

3 Sheets--Sheet 1.

L. M. BATTY.

Improvement in Harvester-Rakes.

No. 5,059. Reissued Sep. 17, 1872.

Witnesses.
Geo. E. Dayton.
Ele. Davidson

L. M. Batty
by his Att'y
Wm D. Baldwin

AM. PHOTO-LITHOGRAPHIC CO. N.Y. (OSBORNE'S PROCESS.)

3 Sheets--Sheet 2.
L. M. BATTY.
Improvement in Harvester-Rakes.
No. 5,059. *Fig. 2.* Reissued Sep. 17, 1872.
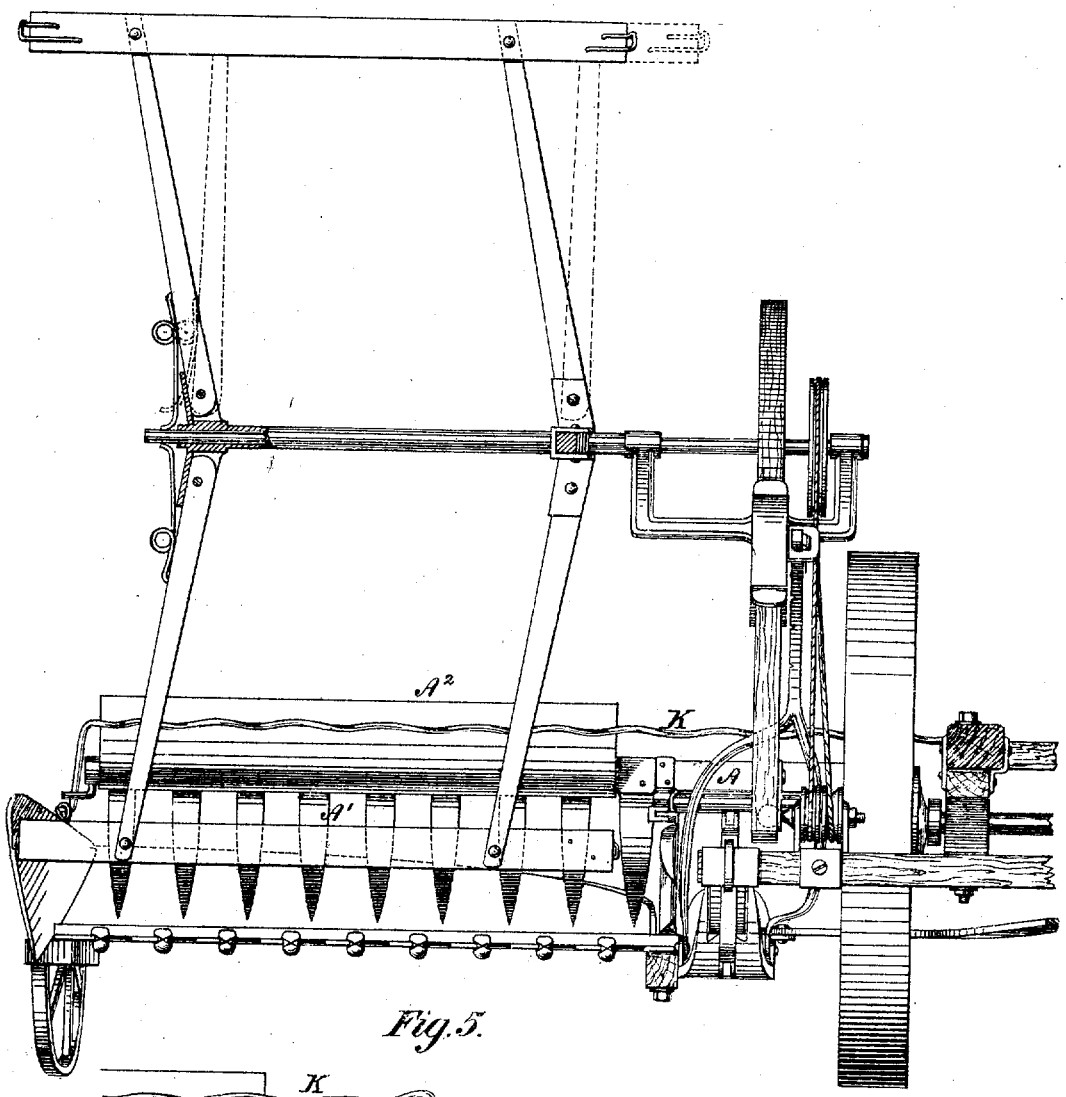
*Fig. 5.*
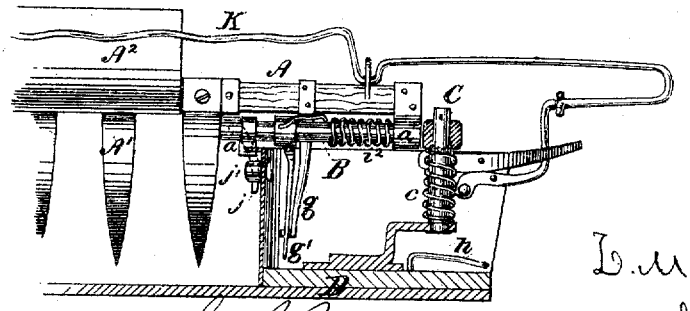
Witnesses. { Joel Sexton. Ele. Davidson
L. M. Batty
by his Atty
Wm. D. Baldwin
A.M. PHOTO-LITHOGRAPHIC CO. N.Y. (OSBORNE'S PROCESS.)

3 Sheets--Sheet 3.
L. M. BATTY.
Improvement in Harvester-Rakes.
No. 5,059. Reissued Sep. 17, 1872.
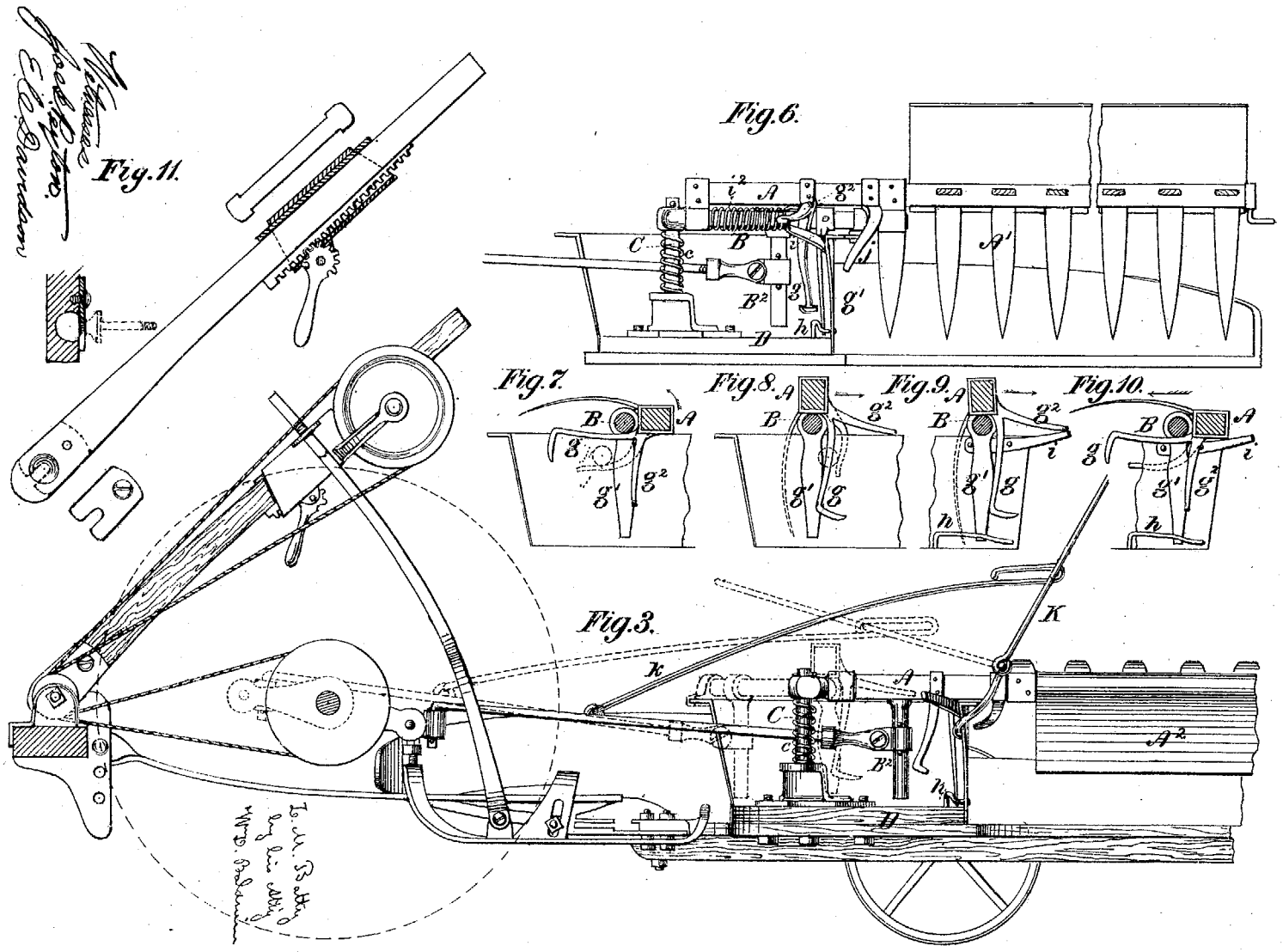
AM. PHOTO-LITHOGRAPHIC CO. N.Y. (OSBORNE'S PROCESS.)

UNITED STATES PATENT OFFICE.

LINDLEY M. BATTY, OF CANTON, OHIO, ASSIGNOR TO WILLIAM K. MILLER, OF SAME PLACE.

IMPROVEMENT IN HARVESTER-RAKES.

Specification forming part of Letters Patent No. 49,963, dated September 19, 1865; reissue No. 5,059, dated September 17, 1872.

DIVISION B.

*To all whom it may concern:*

Be it known that I, LINDLEY M. BATTY, of Canton, in the county of Stark and State of Ohio, have invented certain new and useful Improvements in Harvesters and Harvester-Rakes, of which the following is a specification:

The subject-matter of this division relates to that class of harvester-rakes which move over the platform in a circular path; also, to the cut-off; its objects are effectually to separate the cut grain lying upon the platform from the succeeding gavel; and automatically to turn, lock, and release the rake-teeth at proper intervals to enable them to take hold of and discharge the gavel, and then to rise clear of obstructions in moving forward. The subject-matter claimed is hereinafter specified.

In the accompanying drawing, which shows so much only of the machine as is necessary to illustrate the subject-matter hereinafter claimed, Figure 1 is a plan; Fig. 2, a front elevation; Fig. 3, a side elevation; Fig. 4, a plan of the guide or cam; Fig. 5, a front elevation of the rake, partly in section, on the line *x x* of Fig. 4; Fig. 6, a rear view of the rake-controlling mechanism. Figs. 7, 8, 9, and 10 are detailed views, showing the rake in different attitudes. Fig. 11 shows the details of the reel-bearer.

In this instance the rake is shown as applied to a two-wheeled hinged-bar machine having its drag-bar vertically adjustable at its forward end; but as said machine is described in another division of this application, filed simultaneously herewith, a repetition of said description is unnecessary.

A rake-head, A, is provided with teeth $A^1$ and a shield, $A^2$. Sockets or journals *a* $a^1$ on the rake-head fit on a bifurcated arm, B $B^1$, in such a manner as to allow the rake-head to turn or swing freely on the part B. This arm turns on a post, C, mounted on the platform D, and is held up to its work by a coiled spring, *c*, on the post, which spring, however, allows the arm to yield when an extra-sized gavel is being discharged by the rake. The front member $B^1$ of the arm is provided with a clasp, $b^1$, which slides on the guide-rail E. The rear member of the arm is provided with a similar clasp, $b^2$. The rake is actuated by means of a crank, F, on the main axle, connected by a swiveled pitman to a stud, $B^2$, on the arm B. The pitman-connection is provided with a screw for adjusting its length to secure the proper motion of the rake relative to the other parts of the machine.

The construction of the other parts of the rake-controlling mechanism can best be shown by describing the operation of the rake. The driver can throw the rake into or out of gear by well-known clutch mechanism, unnecessary to be here described. Suppose the rake to start from the position shown in dotted lines in Fig. 1, and in full lines in Figs. 2 and 5—that is, to be moving backward—drawing a gavel with it; while thus moving, the rake-teeth are kept vertical and held down upon the platform by means of a detent-lever, *g*, on the rake-head bearing against a spring-catch, $g^1$, on the part B of the rake arm. (See Figs. 5 and 8.) The backward movement of the crank causes the rake to move backward in the arc of a circle over the platform, sweeping the gavel therefrom and delivering it behind the driving-wheel well out of the way of the team on the next round. (See Fig. 1.) As the rake approaches the point at which the gavel is discharged the spring-catch $g^1$ strikes a switch, *h*, Figs. 3, 5, and 9, which deflects it out of the way of the detent-lever *g*. Just af- the discharge of the gavel the holding-arm $g^2$ on the rake-head escapes from the heel *i* of the guide, (see Figs. 1, 6, and 9,) and the rake is oscillated on its arm by the spiral spring $i^2$ until the teeth are turned up well out of the way. (See Figs. 1 and 10.) The rake now moves forward (with its teeth turned up) until it reaches the proper position to descend upon the grain, when its teeth are turned down by a dog, *j*, on the rake-head striking a lug, *j'*, on the guide E. (See Figs. 1, 5, and 7.) The movements above described are repeated at each discharge of a gavel. A cut-off, K, is pivoted on the platform, as shown, so as to vibrate in a vertical path. A link-rod, *k*, is pivoted at one end to the rake-pitman, and at the other to the cut-off, thus insuring the proper coincidence in the movements of the rake and cut-off; and, to insure a momentary pause in the cut-off at each end of its stroke, the link is slotted so as to allow it a certain amount of end play. The result of this organazation is that as the rake moves forward the cut-off swings in front of it and catches the falling grain while the rake is descending upon the gavel already upon the platform, (see dotted lines in Fig. 1,) and is then retracted and raised out of the way as the rake retracts to discharge the gavel. The cut-off, it will be observed, is waved or corrugated, which construction prevents grain from slipping sidewise.

The front end of the drag-bar is made adjustable vertically, (see Fig. 3,) to vary the inclination of the guards. As the platform and rake-support move in unison with the finger-beam, they are also adjusted by the same movement without detaching or disturbing any of their connections, which, obviously, is advantageous.

I do not broadly claim turning, locking, or releasing the teeth of an automatic rake.

I claim as my invention—

1. The combination of the bifurcated rake-arm, the guide, the rake-head oscillating on said arm, the spring-catch on the rake-arm, and the detent-lever on the rake-head, these members being constructed and operating substantially as set forth, to lock the teeth down upon the platform while raking off the gavel.

2. The combination of the rake-arm, the guide, the rake-head, the detent-lever on the rake-head, the spring-catch on the rake-arm, the switch, and the spiral spring on the rake-arm, these members being constructed and operating as set forth, automatically to release the rake and turn up its teeth after discharging the gavel.

3. The combination, in a harvester, of a rake moving over the platform in a circular path with a cut-off vibrating vertically over the platform, these members being constructed to operate in combination, substantially as hereinbefore set forth.

4. A cut-off having a waved or indented edge or outline, substantially as described, to prevent the grain from slipping sidewise.

LINDLEY M. BATTY.

Witnesses:

A. McKINLEY,

WM. McKINLEY, Jr.